(12) United States Patent
Hayashi et al.

(10) Patent No.: US 10,857,585 B2
(45) Date of Patent: Dec. 8, 2020

(54) TRANSFER DEVICE OF MULTISTAGE FORGING PRESS MACHINE

(71) Applicants: DAIDO STEEL CO., LTD., Nagoya (JP); SAKAMURA HOT ART CO., LTD., Kuse-gun (JP)

(72) Inventors: Hideaki Hayashi, Tokai (JP); Shinichi Miyano, Tokai (JP); Daisuke Enomoto, Kyoto (JP); Masahiro Taniguchi, Kyoto (JP); Minoru Enomoto, Kyoto (JP)

(73) Assignees: DAIDO STEEL CO., LTD., Nagoya (JP); SAKAMURA HOT ART CO., LTD., Kyoto (JP)

( * ) Notice: Subject to any disclaimer, the term of this patent is extended or adjusted under 35 U.S.C. 154(b) by 255 days.

(21) Appl. No.: 15/602,207

(22) Filed: May 23, 2017

(65) Prior Publication Data
US 2017/0341126 A1 Nov. 30, 2017

(30) Foreign Application Priority Data

May 26, 2016 (JP) .................................. 2016-105669
May 26, 2016 (JP) .................................. 2016-105670

(51) Int. Cl.
*B21D 43/05* (2006.01)
*B21K 27/04* (2006.01)
*B21J 9/02* (2006.01)

(52) U.S. Cl.
CPC .............. *B21D 43/05* (2013.01); *B21K 27/04* (2013.01); *B21J 9/022* (2013.01); *H02K 2201/18* (2013.01)

(58) Field of Classification Search
CPC ....... G03F 7/70716; B23Q 1/66; B21K 27/04; B21K 27/00; B21D 43/05; B21J 13/085
(Continued)

(56) References Cited

U.S. PATENT DOCUMENTS 2,689,361 A * 9/1954 Hoyt .......................... B21J 9/18
                                                          470/177
4,430,882 A * 2/1984 Steinhauser ........... B21K 27/00
                                                           72/405.15

(Continued)

FOREIGN PATENT DOCUMENTS

CN          201511099 U       6/2010
CN          203044781 U       7/2013
(Continued)

OTHER PUBLICATIONS

SakamuraHot Art Co Hot Formers (Year: 2014).*
(Continued)

*Primary Examiner* — Lee D Wilson
*Assistant Examiner* — Mahdi H Nejad
(74) *Attorney, Agent, or Firm* — McGinn I.P. Law Group, PLLC.

(57) ABSTRACT

The present invention provides a transfer device of a multistage forging press machine, capable of making a power transmission mechanism compact with a reduced number of components, and capable of easily adjusting a conveyance position. Additionally, the present invention provides a transfer device of a multistage forging press machine, capable of moving a plurality of chuck units in a lump to a place where replacement work can be performed easily, and capable of replacing chuck claws easily.

20 Claims, 6 Drawing Sheets

(58) Field of Classification Search
USPC ................................... 269/58, 55; 409/168
See application file for complete search history.

(56) References Cited

U.S. PATENT DOCUMENTS

| | | | | |
|---|---|---|---|---|
| 5,267,463 | A | 12/1993 | Doyama | |
| 5,865,057 | A * | 2/1999 | Nakano | B21K 27/04 72/361 |
| 6,269,673 | B1 * | 8/2001 | Wang | B21D 43/05 470/109 |
| 6,546,616 | B2 * | 4/2003 | Radowick | B23Q 3/186 269/58 |
| 2007/0135285 | A1 * | 6/2007 | Schiebout | B29C 65/18 493/197 |
| 2013/0113148 | A1 * | 5/2013 | Jang | B62D 65/18 269/58 |
| 2014/0015185 | A1 * | 1/2014 | Hishikawa | B23Q 1/037 269/58 |
| 2014/0132960 | A1 * | 5/2014 | Chen | G01M 5/005 356/457 |
| 2015/0314892 | A1 * | 11/2015 | DesJardien | B64F 5/50 29/559 |
| 2016/0107283 | A1 * | 4/2016 | Domaru | B23Q 11/0028 408/13 |
| 2019/0232360 | A1 * | 8/2019 | Cornish | B21K 27/04 |

FOREIGN PATENT DOCUMENTS

| | | | |
|---|---|---|---|
| CN | 103317504 | A | 9/2013 |
| GB | 2 307 898 | A | 6/1997 |
| JP | 61-182639 | U | 11/1986 |
| JP | H05-092228 | A | 4/1993 |
| JP | 3033122 | U | 10/1996 |
| JP | 2004-298960 | A | 10/2004 |
| JP | 2004298960 | * | 10/2004 |
| JP | 2004298960 | A * | 10/2004 |
| JP | 4605523 | B2 | 1/2011 |
| JP | 2013-078791 | A | 5/2013 |
| JP | 5517147 | B2 | 6/2014 |

OTHER PUBLICATIONS

AGFM Forging Machine 8040 Published on Sep. 21, 2015 at https://www.youtube.com/watch?v=C8GiFwH109k (Year: 2015).*
Chinese Office Action, dated Aug. 27, 2018 in Chinese Application No. 201710385354.6 and English Translation thereof.
Japanese Office Action, dated Oct. 8, 2019, in Japanese Application No. 2016-105670 and English Translation thereof.
Japanese Office Action, dated Oct. 8, 2019, in Japanese Application No. 2016-105669 and English Translation thereof.

* cited by examiner

TRANSFER DEVICE OF MULTISTAGE FORGING PRESS MACHINE

FIELD OF THE INVENTION

The present invention relates to a transfer device of a multistage forging press machine for conveying a workpiece sequentially to a plurality of forging portions provided side by side. In addition, the present invention relates to a transfer device of a multistage forging press machine, capable of easily replacing chuck claws for holding a workpiece therebetween.

BACKGROUND OF THE INVENTION

For example, in a multistage forging press machine in which a plurality of forging portions provided with dies and punches are provided side by side in a horizontal direction, a transfer device for conveying a workpiece from one forging portion to another is provided as disclosed in the following Patent Document 1 or Patent Document 3.

Such a transfer device has a plurality of chuck units each having chuck claws in its front end portion so that a workpiece held between the chuck claws can be conveyed to a forging portion in the next stage.

On this occasion, the transfer device moves the chuck units in the horizontal direction in which the forging portions are provided side by side. In addition, the transfer device may often move the chuck units in a vertical direction perpendicular to the horizontal direction in order to avoid interference with the punches and the dies. In the background art, a main motor for driving a press ram is used as a power source for performing such moving operations in the horizontal direction and in the vertical direction.

In such a case, the power of the main motor is transmitted to a transfer beam or the like through a power transmission mechanism constituted by a gear, a cam, a link mechanism, etc. Each chuck unit is attached to such a transfer beam or the like.

Therefore, in a background-art transfer device using a main motor as a power source, the length of the power transmission mechanism increases, and the number of components constituting the power transmission mechanism also increases, whereby there arises a problem that the power transmission mechanism is complicated.

Such a complicated mechanism is expensive in manufacturing cost, and the maintenance cost thereof is also increased.

When misalignment occurs between a die and a workpiece received in the die in a forging portion, the misalignment may cause a problem such as misalignment between an outer diameter and an inner diameter in the workpiece forged by the forging portion. It is therefore necessary to adjust the conveyance position of the workpiece both in a horizontal direction and a vertical direction in order to keep the positional accuracy of the workpiece when the workpiece is conveyed by the transfer device of the multistage forging press machine.

However, specifically in the transfer device using a main motor as a power source, the length of a link or the cam curve of a cam constituting the power transmission mechanism has to be changed to adjust the conveyance position. Thus, work of replacing or adjusting the component is required. As a result, a suspension period of the forging press machine is elongated to hinder a production time of a product.

Incidentally, the following Patent Document 2 discloses that a servo motor is used as a power source of the transfer device. In the transfer device according to Patent Document 2, servo motors are connected to opposite ends of a pair of beams having a plurality of pairs of fingers (chuck claws) through articulated arms respectively, so that two-dimensional or three-dimensional actions can be given to the beams by cooperation between the servo motors at the opposite ends.

However, the transfer device disclosed in Patent Document 2 is different from that of the present invention at a point of a conveyance mechanism in which the servo motors cannot move the beams in the horizontal direction or in the vertical direction independently of each other.

In a transfer device according to the following Patent Document 1 or Patent Document 3, a plurality of chuck units corresponding to the number of stages of forging portions are provided so that a workpiece can be held between a pair of chuck claws provided in a front end portion of each chuck unit and conveyed to a forging portion in the next stage.

The chuck claws are replaced, for example, when a workpiece to be machined (forged product) has a different outer diameter.

However, the chuck claws are typically located between a die and a punch and under the chuck unit (front end side). A worker has to perform the replacement work in a narrow site. In addition, the worker has to take an unnatural working posture. Thus, there is a problem in workability or safety.

In order to make it easy to perform the replacement work, it is therefore desired to move the chuck units in advance to a place where the worker can perform the work easily.

However, in such a transfer device, a main motor for driving a press ram is used as a power source for moving and conveying the workpiece to the next forging portion. The transfer device has a configuration in which the power of the main motor is transmitted to a transfer beam or the like, to which each chuck unit has been attached, through a power transmission mechanism constituted by a gear, a cam, a link mechanism, etc.

For this reason, in the background-art transfer device, the structure around the chuck unit is complicated, and the number of components increases. Those components serve as obstacles when the chuck unit is moved to a place where the replacement work can be performed easily. Thus, there arises a problem that a movable range of the chuck unit is limited.

Incidentally, the following Patent Document 3 discloses an invention about a "transfer chuck in a heading machine", and suggests a point that a chuck unit provided with a chuck (chuck claws) is fastened and fixed to a chuck frame by a bolt, and a point that the chuck unit is replaced by another chuck unit having a different chuck shape in accordance with a change in shape of a workpiece, a forming sequence of the workpiece, etc. However, there is no suggestion about a point that the chuck unit is moved to a place where the replacement work can be performed easily.

Patent Document 1: JP-A-2013-78791
Patent Document 2: Japanese Patent No. 5517147
Patent Document 3: Japanese Patent No. 4605523

SUMMARY OF THE INVENTION

The present invention has been developed in consideration of the aforementioned situation. An object of the present invention is to provide a transfer device of a multistage forging press machine, capable of making a power transmission mechanism compact with a reduced number of components, and capable of easily adjusting a conveyance position.

In addition, another object of the present invention developed in consideration of the aforementioned situation is to provide a transfer device of a multistage forging press machine, capable of moving a plurality of chuck units in a lump to a place where replacement work can be performed easily, and capable of replacing chuck claws easily.

Namely, the present invention relates to the following configurations (1) to (3).

(1) A transfer device of a multistage forging press machine, the transfer device being provided in the multistage forging press machine in which a plurality of forging portions are provided side by side in a horizontal direction so that a workpiece is conveyed sequentially from one of the forging portions to a next one, the transfer device including:
(a) a base plate that includes a support surface extending in the horizontal direction and a vertical direction;
(b) a first plate that is slidable and movable in the horizontal direction or the vertical direction along a guide rail provided on the support surface of the base plate;
(c) a second plate that is slidable and movable in the vertical direction or the horizontal direction along a guide rail provided on the first plate;
(d) a plurality of chuck units that are attached to the second plate to hold a workpiece;
(e) a horizontally driving servo motor that drives the first plate or the second plate in the horizontal direction; and
(f) a vertically driving servo motor that drives the second plate or the first plate in the vertical direction,
in which the horizontally driving servo motor is connected through a link mechanism to the first plate or the second plate that is slidable and movable in the horizontal direction, and the vertically driving servo motor is connected through a link mechanism to the second plate or the first plate that is slidable and movable in the vertical direction, and
the vertically driving servo motor is attached to the base plate in an opposite position to the first plate with respect to the base plate so that an output shaft of the vertically driving servo motor extends in the vertical direction.

(2) The transfer device of a multistage forging press machine according to (1), further including:
a rotational moving unit that rotates the base plate around an axis line in the horizontal direction so that the plurality of chuck units are rotated and moved together with the base plate.

(3) The transfer device of a multistage forging press machine according to (2), in which the rotational moving unit has a rotatable range of up to approximately 180° so that the chuck units are reversed in an opposite position to the forging portions with respect to the axis line.

As described above, according to the present invention, a horizontally driving servo motor is provided as a power source for driving the first plate or the second plate in a horizontal direction, and a vertically driving servo motor is provided as a power source for driving the second plate or the first plate in a vertical direction. Each servo motor is connected through a link mechanism to a plate to be driven by the servo motor. In this manner, the chuck units attached to the second plate can be moved in the horizontal direction or in the vertical direction.

According to the present invention, it is possible to dispense with a complicated cam mechanism which has been used in the background art in order to extract a moving timing of the transfer device from a rotary motion of the main motor. In addition, each servo motor serving as a power source can be placed in a position adjacent to a plate to be driven by the servo motor. Therefore, a power transmission mechanism can be made compact with a reduced number of components, as compared with the background-art configuration in which power from a main motor for driving a press ram is transmitted over a long distance. As a result, it is also possible to suppress the manufacturing cost and the maintenance cost of the transfer device.

In addition, according to the present invention, three plates (the base plate, the first plate and the second plate) can be disposed to overlap one another longitudinally in a body part of the transfer device. Thus, the configuration of the transfer device can be made compact in the thickness direction of the plates.

In addition, according to the present invention, it is possible to easily adjust the conveyance position both in the horizontal direction and in the vertical direction.

In the background-art transfer device using the main motor as power source, the length of the link or the cam curve of the cam constituting the power transmission mechanism is changed to adjust the conveyance position. It is therefore necessary to replace or adjust the link or the cam. Thus, the suspension time of the machine is elongated.

On the other hand, according to the present invention, the stop position of the chuck units can be changed desirably both in the horizontal direction and in the vertical direction by only changing indicated values of the servo motors to change the rotation amounts of their output shafts (without changing any power transmission mechanism component such as the link). As a result, according to the present invention, the conveyance position can be adjusted even when the press machine is being operated. Thus, the time required for the position adjustment work can be considerably shortened as compared with that in the background art.

In addition, according to the present invention, the vertically driving servo motor is attached to the base plate in an opposite position to the first plate with respect to the base plate, so that the output shaft of the vertically driving servo motor can extend in the vertical direction.

Due to this configuration, the vertically driving servo motor and the plate to be driven thereby (the first plate or the second plate) can be disposed closely to each other while holding the base plate longitudinally therebetween. Thus, the link mechanism as a power transmission mechanism disposed between the vertically driving servo motor and the plate to be driven thereby can be formed with a shorter and more compact configuration.

Further, according to the aforementioned configuration (2), the plurality of chuck units, the second plate holding the chuck units, and the first plate can be rotated and moved together with the base plate. According to the present invention thus configured, the chuck units can be moved in a lump to a place where the replacement work can be performed easily.

In addition, according to the present invention, the horizontally driving servo motor is provided as a power source for driving the first plate or the second plate in the horizontal direction, and connected to the first plate or the second plate through the link mechanism.

According to the present invention thus configured, it is possible to dispense with a complicated cam mechanism. Thus, the power transmission mechanism can be made compact with a reduced number of components as compared with the background-art configuration in which the power from the main motor for driving the press ram is transmitted using the gear, the cam, the link mechanism, etc. As a result, components that may serve as obstacles when the chuck units are rotated and moved can be made as few as possible. Thus, a wide rotatable range can be secured for the chuck units.

Particularly according to the aforementioned configuration (3), the rotational moving unit has a rotatable range of up to approximately 180°. The chuck units are moved to an opposite position to the forging portions with respect to a rotational axis line of the chuck units. At that position, the chuck units are reversed. In this manner, chuck claws of the chuck units can look upward just in a maintenance space prepared in a distant position from the forging portion. Thus, it is possible to further improve workability.

When the transfer device conveys and moves a workpiece to the next forging portion, the chuck units may be moved not only in the horizontal direction in which the forging portions are arranged side by side, but also in the vertical direction perpendicular to the horizontal direction in order to avoid interference with the punches or the dies.

In this case, a vertical power transmission mechanism is also provided around the chuck units as well as the horizontal power transmission mechanism. Thus, the number of components that may serve as obstacles when the chuck units are rotated and moved is increased. It is therefore difficult to secure a wide rotatable range.

However, according to the aforementioned configuration (1) in which the vertically driving servo motor serving as a power source for driving in the vertical direction is attached to the base plate, the vertically driving servo motor and the plate to be driven thereby (the first plate or the second plate) can be disposed closely to each other. Thus, the link mechanism as a power transmission mechanism disposed between the vertically driving servo motor and the plate to be driven thereby can be formed with a shorter and more compact configuration.

Further, according to the aforementioned configuration (2), the vertically driving servo motor and the vertically driving link mechanism rotate and move together with the base plate. Therefore, components of the power transmission mechanism can be effectively prevented from being left behind on the base side of the press machine as obstacles when the vertically driving servo motor and the vertically driving link mechanism are rotating and moving.

Here, when a part of the components of the vertically driving power transmission mechanism is left behind on the base side of the press machine, it is necessary to isolate the left part in advance to allow the chuck units to rotate. However, according to the aforementioned configuration (2), all the components of the vertically driving power transmission mechanism including a power source are included on the side to be rotated and moved. It is therefore possible to dispense with such an isolation work.

According to the present invention thus configured, it is possible to provide a transfer device of a multistage forging press machine, capable of making a power transmission mechanism compact with a reduced number of components, and capable of easily adjusting a conveyance position.

In addition, according to the present invention thus configured, it is possible to provide a transfer device of a multistage forging press machine, capable of moving a plurality of chuck units in a lump to a place where replacement work can be performed easily, and capable of replacing chuck claws easily.

DETAILED DESCRIPTION OF THE INVENTION

Next, an embodiment of the present invention will be described in detail with reference to the drawings.

Figure 1:
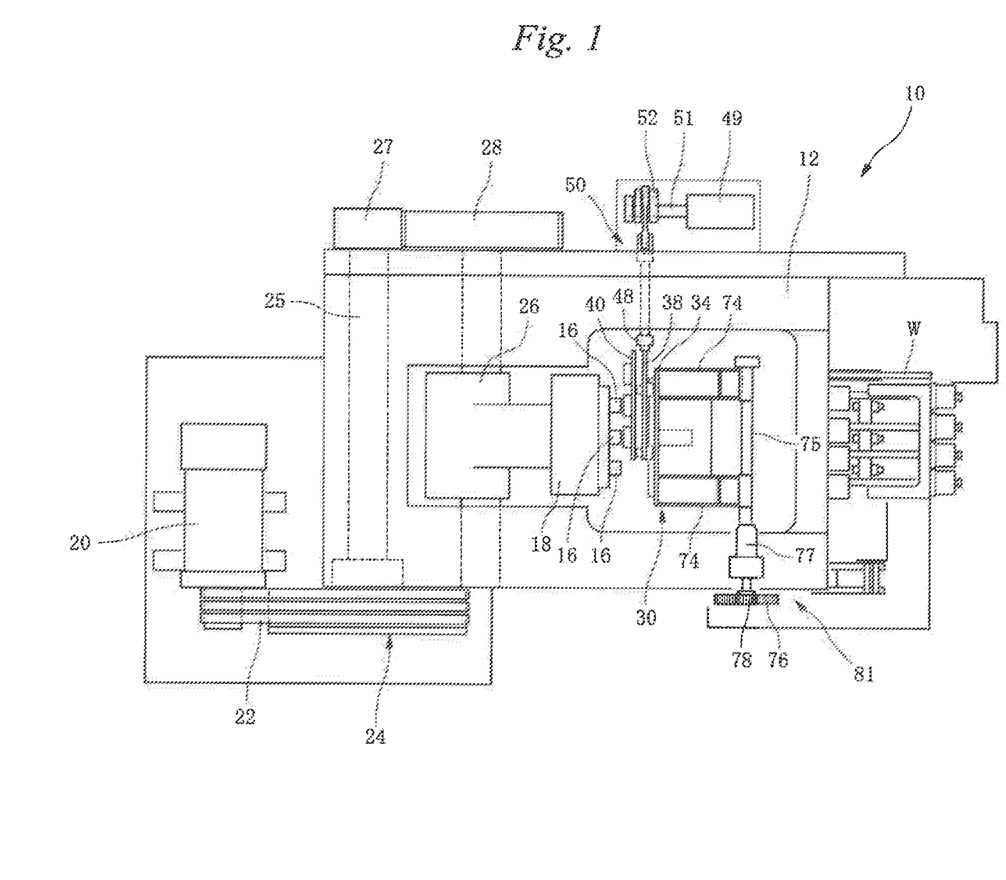
FIG. 1 is a plan view of a multistage forging press machine provided with a transfer device according to an embodiment of the present invention.

FIG. 1 is a plan view of a multistage forging press machine provided with a transfer device according to the present embodiment.

In FIG. 1, the reference numeral 10 represents a multistage forging press machine (hereinafter also referred to as forging press machine), in which a plurality (three stages here) of forging portions for forging a workpiece are provided side by side at predetermined intervals in a horizontal direction inside a frame 12 having a box-like shape.

Each forging portion is constituted by a die 14 (FIG. 3) fixed to the frame 12, and a punch 16 disposed to be opposed to the die 14.

Figure 3:
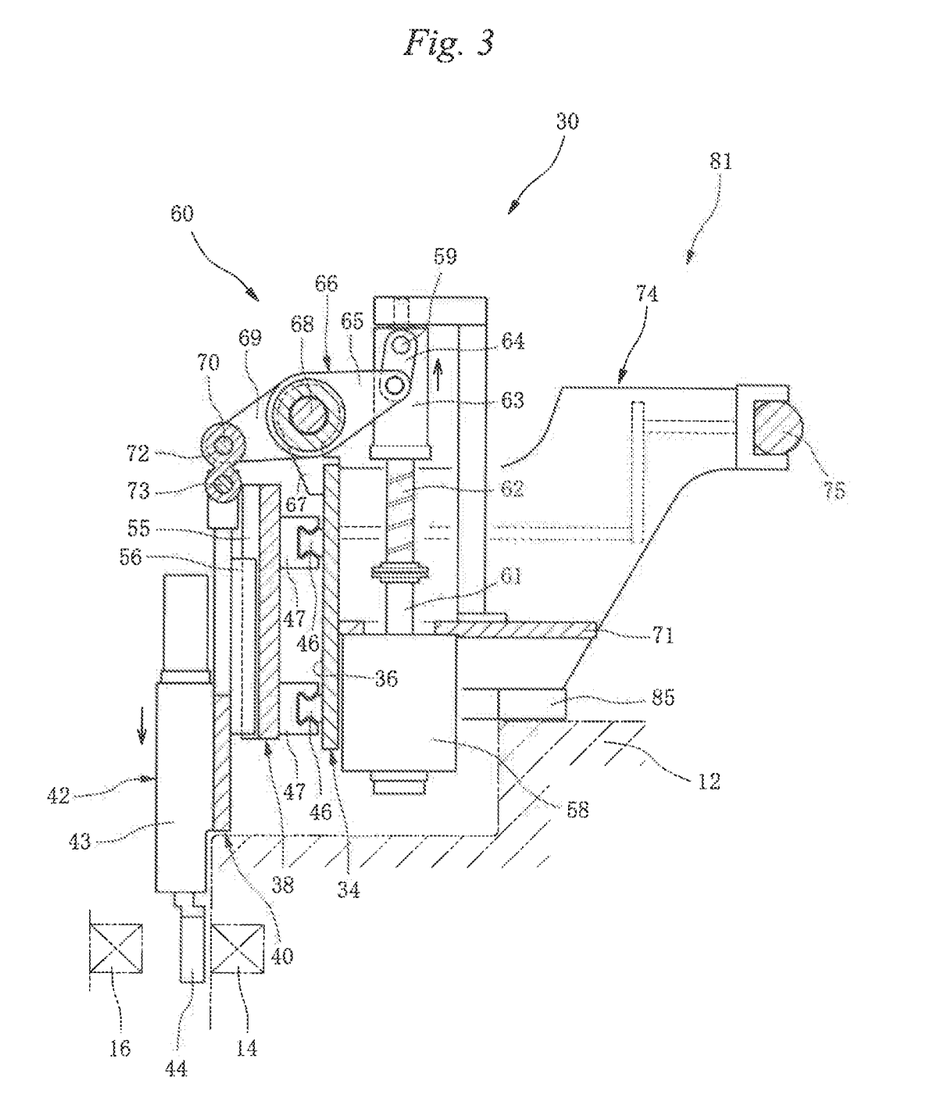
FIG. 3 is a sectional view of the transfer device in FIG. 1.

Such punches 16 are attached to a front end portion of a ram 18 so that a material (workpiece) can be formed concurrently in each forging portion by forward movement of the ram 18.

A main motor 20 serving as a power source for the ram 18 is provided in the forging press machine 10 in the present embodiment. The main motor 20 is connected to a flywheel 24 through a belt 22. The flywheel 24 is connected to the ram 18 through a crankshaft 26.

In detail, a pinion gear 27 provided at an end portion of a fly wheel shaft 25 on the opposite side to the fly wheel 24 and a large gear 28 provided at an end portion of the crank shaft 26 are connected to be engaged with each other.

Thus, in the present embodiment, as the fly wheel 24 is rotated by the power of the main motor 20, the ram 18 moves forward and backward due to the power of the fly wheel 24. That is, the punches 16 attached to the front end side of the ram 18 move forward and backward relatively to the dies 14 to thereby perform forging.

In the forging press machine 10 thus configured, a material (workpiece W) supplied from the outside is cut into a predetermined size by a not-shown cutter, and then passed through the three stages of forging portions sequentially. Thus, the workpiece W is formed into a predetermined shape. On this occasion, the workpiece W is conveyed to each forging portion by a transfer device 30.

A product that has been completely forged is conveyed to the outside of the machine by a not-shown conveyance device.

As shown in FIG. 1, in the forging press machine 10 according to the present embodiment, a space above the frame 12 is made open in a part where the forging portions are disposed. In this open space, a body part of the transfer device 30 is disposed in a position above the dies 14.

Figure 2A:
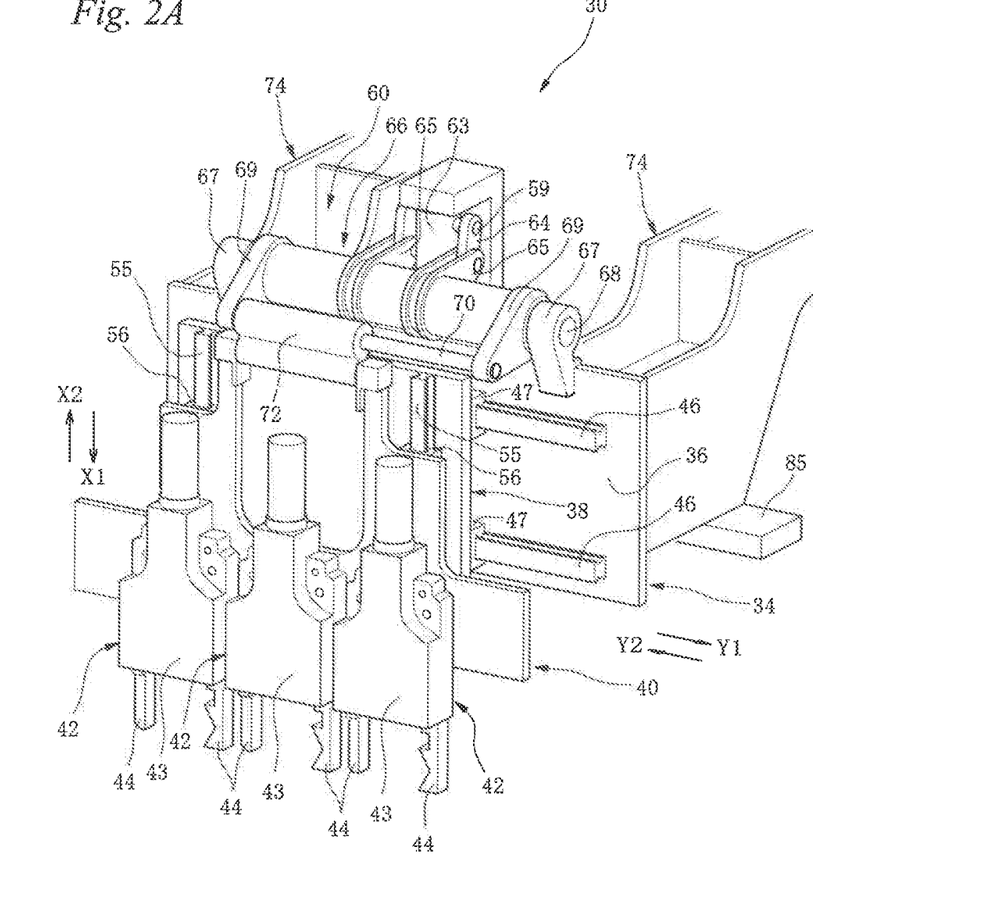
FIG. 2A is a perspective view showing a main portion of the transfer device in FIG. 1.

FIG. 2A is a perspective view showing a main portion of the transfer device 30.

As shown in FIG. 2A, in the transfer device 30, three plates, that is, a base plate 34, a first plate 38 and a second plate 40 are disposed in this order longitudinally to be opposed to one another, and chuck units 42 are attached onto the second plate 40.

The base plate 34 has a flat support surface 36.

The base plate 34 is fixed to the frame 12 of the forging press machine 10 so that the support surface 36 is put in parallel to a horizontal direction (a direction in which the dies 14 are provided side by side) and a vertical direction perpendicular to the horizontal direction.

Guide rails 46 are attached to the support surface 36 so as to extend in the horizontal direction. The first plate 38 is held slidably and movably by the guide rails 46.

In the first plate 38, engagement blocks 47 to be engaged with the guide rails 46 are attached to a surface opposed to the support surface 36 of the base plate 34. A plurality of balls are disposed between each of the guide rails 46 and a corresponding one of the engagement blocks 47 so that a linear guide can be constituted by the guide rails 46 and the engagement blocks 47. Thus, the first plate 38 is slidable and movable in the horizontal direction (the direction in which the dies 14 are provided side by side) relatively to the base plate 34.

Figure 4A:
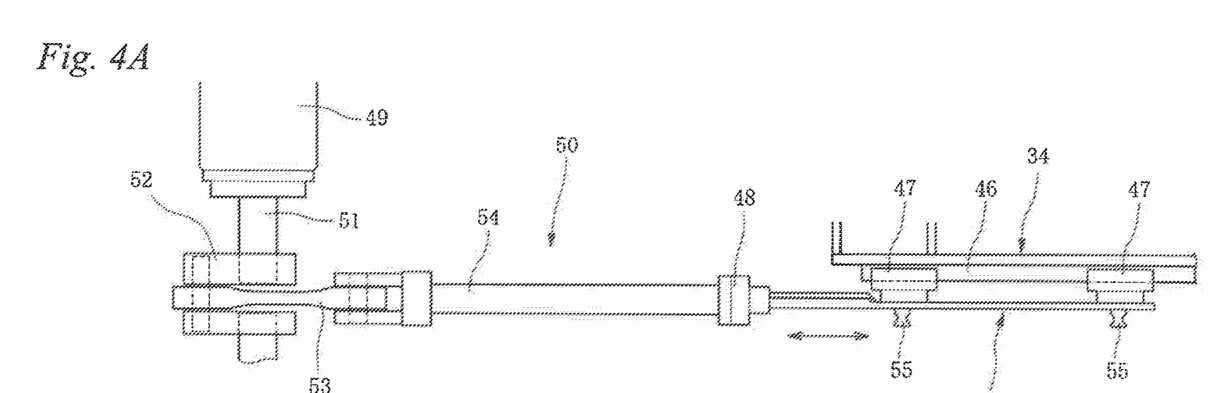
FIG. 4A and FIG. 4B are views showing a configuration of a first link mechanism 50.
Figure 4B:
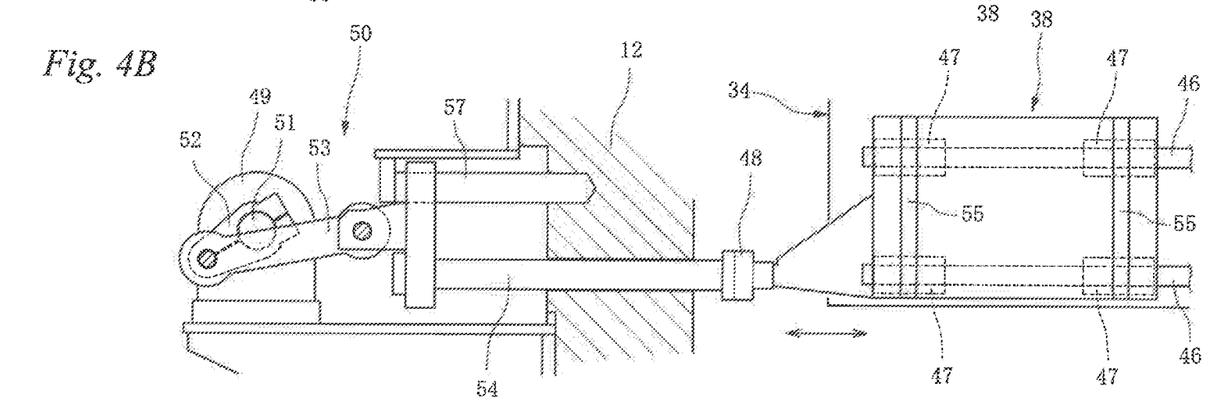

In addition, as shown in FIG. 4A and FIG. 4B, a horizontally driving servo motor 49 for driving the first plate 38 in the horizontal direction is connected to the first plate 38 through a first link mechanism 50.

The horizontally driving servo motor 49 is fixed to the forging press machine 10 so that an output shaft 51 of the horizontally driving servo motor 49 extends in a direction perpendicular to the sliding direction of the first plate 38.

A crankshaft 52 is attached to a front end of the output shaft 51 of the horizontally driving servo motor 49, and one end of a first rod 53 is rotatably connected to the crankshaft 52. The other end of the first rod 53 is rotatably connected to a second rod 54 extending in the horizontal direction from the first plate 38 through a connection portion 48.

Here, the second rod 54 is made movable only in the horizontal direction along a guide shaft 57 shown in FIG. 4B.

In the present embodiment, the first link mechanism 50 is constituted by the crankshaft 52, the first rod 53 and the second rod 54.

In the present embodiment, when the output shaft 51 of the horizontally driving servo motor 49 makes a reciprocating rotation or a unidirectional rotation within a predetermined angle range, the rotation is converted into a horizontal reciprocating motion and transmitted to the first plate 38 by the first link mechanism 50. Thus, the first plate 38 also reciprocates in the horizontal direction.

According to the present embodiment, a horizontal stop position of the first plate 38 can be changed easily into a desired position by only changing the rotation amount of the output shaft 51 of the horizontally driving servo motor 49.

Incidentally, guide rails 55 for holding the second plate 40 slidably and movably are attached in a vertical (up/down) direction on an opposite surface of the first plate 38 to the base plate 34.

In the second plate 40, as shown in FIG. 2A and FIG. 3, engagement blocks 56 to be engaged with the guide rails 55 are attached to a surface opposed to the first plate 38. A plurality of balls are disposed between each of the guide rails 55 and a corresponding one of the engagement blocks 56 so that a linear guide is constituted by the guide rails 55 and the engagement blocks 56. Thus, the second plate 40 can slide and move in the vertical direction relatively to the base plate 34 through the first plate 38.

As shown in FIG. 3, a vertically driving servo motor 58 is connected to the second plate 40 through a second link mechanism 60.

The vertically driving servo motor 58 is attached to the base plate 34 in a position on the back side (the opposite side to the support surface 36) of the base plate 34 so that an output shaft 61 of the vertically driving servo motor 58 extends in the vertical direction. In detail, the vertically driving servo motor 58 is attached to a bracket 71 formed integrally with the base plate 34.

A shaft 62 having a male thread formed in the outer circumferential surface thereof is attached to the output shaft 61 of the vertically driving servo motor 58. A nut 63 having a female thread formed in the inner circumferential surface thereof is fitted and assembled to the outer circumference of the shaft 62. A plurality of balls are disposed between the male thread and the female thread. Thus, a ball screw is formed by the shaft 62 and the nut 63.

A pair of pins 59 projecting outward in a radial direction are provided in an outer circumferential surface of the nut 63. One end of an intermediate lever 64 is rotatably connected to each pin 59. The other end of the intermediate lever 64 is rotatably connected to an extension lever 65 extended toward the nut 63 from an axially central portion of a rocking member 66, which will be described later.

As shown in FIG. 2A and FIG. 3, a shaft rod 68 extending in the horizontal direction is supported by a pair of bracket 67 attached and fixed to the base plate 34. The rocking member 66 is rockably attached to the shaft rod 68.

A pair of holding arms 69 are extended from both ends of the rocking member 66 toward the second plate 40 on the opposite side to the extension lever 65, so as to hold a guide shaft 70.

The guide shaft 70 is provided in parallel to the guide rails 46 of the base plate 34. A slide block 72 is attached to the guide shaft 70 slidably in an axial direction thereof and rotatably around the axis thereof.

The front end side of the slide block 72 is rotatably connected to the second plate 40 through a connection shaft 73 (FIG. 3).

In the present embodiment, the second link mechanism 60 is constituted by the pins 59, the intermediate lever 64, the rocking member 66, the guide shaft 70, the slide block 72 and the connection shaft 73.

In the present embodiment, when the vertically driving servo motor 58 rotates the output shaft 61, the rotational motion of the vertically driving servo motor 58 is converted into a vertical linear motion of the nut 63 by a screw feeding operation in the ball screw.

For example, when the nut 63 moves upward, the rocking member 66 rocks around the shaft rod 68 and in a direction pushing the guide shaft 70 downward. Thus, the second plate 40 connected through the guide shaft 70 and the slide block 72 moves downward.

On the contrary, when the nut 63 moves downward, the rocking member 66 rocks around the shaft rod 68 and in a direction lifting up the guide shaft 70. Thus, the second plate 40 moves upward.

According to the present embodiment, a vertical stop position of the second plate 40 can be changed easily into a desired position by only changing the rotation amount of the output shaft 61 of the vertically driving servo motor 58.

Incidentally, the slide block 72 is formed slidably in the horizontal direction along the guide shaft 70. No interference may occur inside the second link mechanism 60 even if the second plate 40 moves in the horizontal direction together with the first plate 38 when the first plate 38 slides and moves in the horizontal direction.

As shown in FIG. 2A and FIG. 3, each chuck unit 42 includes a chuck body 43 and a pair of left and right chuck claws 44 and 44 located on the front end side of the chuck body 43 (on the illustrated lower side) so that the workpiece W can be held between the chuck claws 44 and 44. A cylinder head and a link mechanism are received inside the chuck body 43. The cylinder head is driven forward and backward in the vertical direction by air pressure. The link mechanism is connected to the cylinder head. A base end of each chuck claw 44 is connected to the link mechanism.

In the chuck unit 42, when the cylinder head inside the chuck body 43 is moved in the vertical direction by the air pressure, the motion of the cylinder head is converted into a motion of opening/closing in a left/right direction by the link mechanism. Interlocking therewith, the pair of chuck claws 44 and 44 also move to be opened/closed in the left/right direction.

Figure 2B:
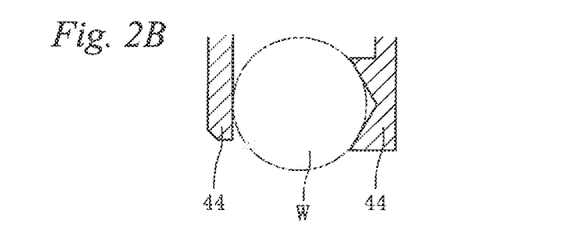
FIG. 2B is a view showing a state in which a workpiece W is held by a pair of chuck claws 44 and 44.

As shown in FIG. 2B, of the pair of chuck claws 44 and 44 in the present embodiment, one of the inner surfaces holding the workpiece W has a straight shape, and the other has a V-groove shape. When the pair of chuck claws 44 and 44 are moved to be closed, the pair of chuck claws 44 and 44 abut against the circular outer circumferential surface of the workpiece W at three places to thereby hold the workpiece W between the chuck claws 44 and 44.

Figures 5A, 5B:
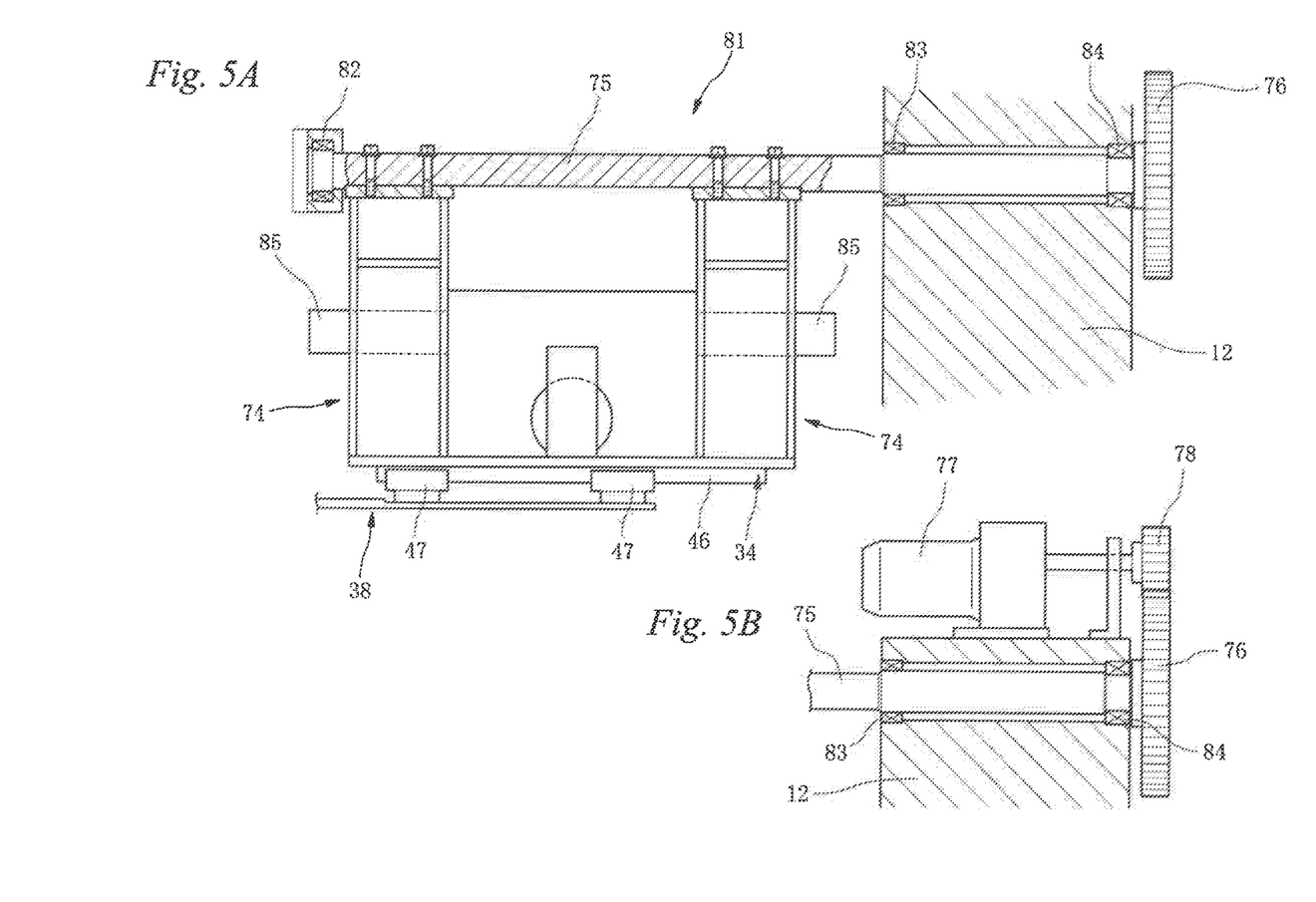
FIG. 5A and FIG. 5B are views showing a configuration of a rotational moving unit 81.

Incidentally, it is preferable that the transfer device 30 according to the present embodiment includes a rotational moving unit 81 for rotating and moving the base plate 34 relatively to the frame 12.

Specifically the rotational moving unit 81 is configured as follows.

In FIG. 5A, the reference numeral 75 represents a rotating shaft attached to the frame 12 so as to extend in parallel with the direction in which the forging portions are provided side by side. The rotating shaft 75 is rotatably supported through bearings 82, 83 and 84 provided at a plurality of places in its axial direction.

A gear body 76 is attached to one end (on the right side of FIG. 5A) of the rotating shaft 75.

As shown in FIG. 5B, a motor 77 serving as a power source is provided above the rotating shaft 75. A gear body 78 is attached to an output shaft of the motor 77. The gear body 78 is engaged with the gear body 76 on the rotating shaft 75 side.

On the other hand, a pair of connection members 74 and 74 are provided between the base plate 34 and the rotating shaft 75. One end of each of the connection members 74 is fixedly connected to the base plate 34, and the other end thereof is fixedly connected to the rotating shaft 75.

Normally (during operation of conveyance), a fixation piece 85 provided in a bottom surface of the connection member 74 is pressed onto the upper surface of the frame 12 by a clamping device or the like, so as to fix the base plate 34. However, in order to perform work of replacing the chuck claws 44 or the like, the fixation between the fixation piece 85 and the frame 12 is cancelled, and the motor 77 is then rotated and driven. In this manner, the base plate 34 can be rotated together with the rotating shaft 75 and the connection member 74 through the gear bodies 78 and 76.

In the present embodiment, the rotational moving unit 81 is constituted by the motor 77, the gear bodies 78 and 76, the rotating shaft 75 and the connection members 74.

In the forging press machine provided with the transfer device, a target to be machined may be changed to a workpiece (forged product) having another outer diameter. In such a case, the chuck claws for holding the workpiece are replaced.

However, chuck claws of each chuck unit are located between a die and a punch and below the chuck unit. Therefore, the replacement work must be performed in a narrow site when the chuck claws remain as they are. In addition, a worker carrying out the work may have an unnatural posture. Thus, there is a problem in workability or safety.

Figure 6:
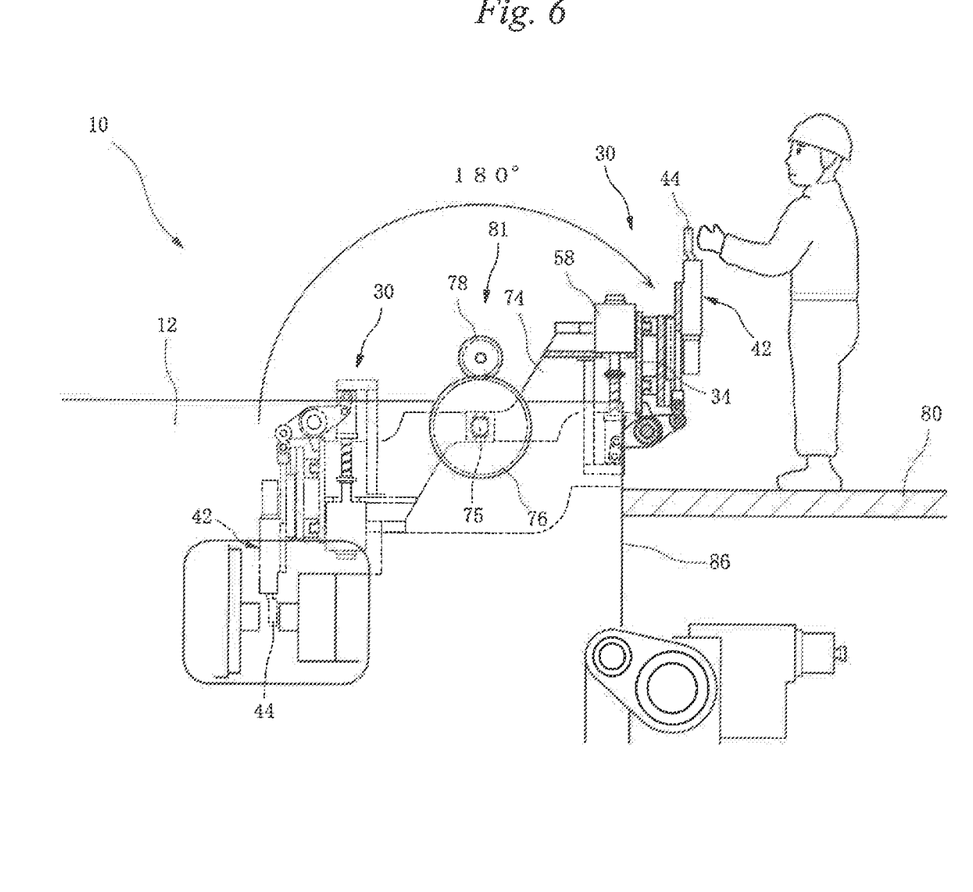
FIG. 6 is a view showing a state in which a chuck unit has been rotated and moved.

In the present embodiment, as shown in FIG. 6, a deck 80 is installed as a scaffold for the work of replacement of chuck claws. The deck 80 is installed in an opposite position to the forging portions with respect to the rotating shaft 75 and particularly following an end face 86 of the frame 12 of the forging press machine 10. The chuck unit 42 is rotated and moved to the position of the deck 80 where the claws can be replaced easily. The chuck claws 44 and 44 are then replaced.

The chuck unit 42 is rotated and moved in the following procedure.

Normally (during operation of conveyance), the fixation piece 85 provided in the bottom surface of the connection member 74 is pressed onto the upper surface of the frame 12 by a clamping device or the like, so as to fix the base plate 34. However, for example, in order to rotate and move the chuck unit 42, the fixation between the fixation piece 85 and the frame 12 is cancelled.

Further, in the present embodiment, the horizontally driving servo motor 49 and the first link mechanism 50 are fixed to the frame 12 side of the forging press machine 10. Therefore, the connection between the first link mechanism 50 and the first plate 38 is cancelled by the connection portion 48.

Next, the motor 77 is rotated and driven to rotate and move the base plate 34 around the axis line of the rotating shaft 75 together with the rotating shaft 75 and the connection member 74 through the gear bodies 78 and 76. Concurrently, the plurality of chuck units 42 held on the base plate 34 are also rotated and moved through the first plate 38 and the second plate 40.

FIG. 6 shows a state in which a chuck unit 42 has been rotated around the rotating shaft 75 by 180° and moved to the position of the deck 80.

According to the present embodiment, as shown in FIG. 6, the chuck units 42 are moved to the position of the deck 80 prepared for maintenance by the rotational moving unit 81. Thus, a wide working space can be secured.

Further on this occasion, the chuck claws 44 of each chuck unit 42 look upward when the chuck unit 42 is rotated around the axis line of the rotating shaft 75 by 180°. Thus, the work of the replacement can be carried out easier.

In addition, on this occasion, the chuck claws 44 may be set to be as high as the waist or bust of the worker to further improve the workability, as shown in FIG. 6.

By the transfer device 30 thus configured, the workpiece W is conveyed as follows.

Incidentally, in the forging press machine 10 according to the present embodiment, a workpiece insertion/extraction unit (not shown) is provided in each forging portion. The workpiece insertion/extraction unit moves the workpiece W in the axial direction of the die and the punch to thereby carry out an operation of extracting the workpiece W from the die 14 and an operation of inserting the workpiece W to the die 14. The workpiece W is conveyed in cooperation between the transfer device 30 and the workpiece insertion/extraction unit.

When forging is terminated, the workpiece W is pushed out from the die 14 by the workpiece insertion/extraction unit. The transfer device 30 drives the vertically driving servo motor 58 so that the chuck unit 42 in which the chuck claws 44 have been opened can be moved down from its original position together with the second plate 40 (in the direction X1 in FIG. 2A). Thus, the chuck claws 44 at the front end of the chuck unit 42 are stopped in predetermined positions. FIG. 3 is a view showing that state.

Next, the chuck claws 44 are closed to hold the workpiece W therebetween.

Next, the horizontally driving servo motor 49 is driven to move the chuck unit 42 together with the second plate 40 and the first plate 38 in the horizontal direction (the direction Y1 in FIG. 2A) in the state where the workpiece W is held between the chuck claws 44. Thus, the workpiece W is conveyed to the position of a die in the next stage.

The workpiece W conveyed to the position of the die 14 in the next stage is held by the workpiece insertion/extraction unit, and the transfer device 30 opens the chuck claws 44. Incidentally, the workpiece W is inserted into the die 14 by the workpiece insertion/extraction unit.

Next, the transfer device 30 drives the vertically driving servo motor 58 so that the chuck unit 42 in which the chuck claws 44 have been opened can be moved up together with the second plate 40 (in the direction X2 in FIG. 2A). Thus, the chuck unit 42 is stopped in a predetermined position.

Next, the horizontally driving servo motor 49 is driven to move the chuck unit 42 together with the second plate 40 and the first plate 38 in the horizontal direction (in the direction Y2 in FIG. 2A). Thus, the chuck unit 42 is returned to its original position.

Incidentally, the driving of each servo motor, that is, the movement of the transfer device is controlled by a control portion (not shown) based on an encoder signal from the crankshaft 26 side for moving the ram 18 forward and backward.

According to the present embodiment, as has been described above, it is possible to dispense with a complicated cam mechanism for extracting a moving timing of the transfer device 30 from a rotational motion of the main motor 20. In addition, the horizontally driving servo motor 49 and the vertically driving servo motor 58 as power sources can be placed in adjacent positions to plates to be driven by the horizontally driving servo motor 49 and the vertically driving servo motor 58 respectively. Thus, the power transmission mechanism can be made compact with a reduced number of components as compared with a background-art configuration in which power from a main motor for driving a press ram is transmitted over a long distance. In addition, it is therefore possible to suppress the manufacturing cost and the maintenance cost of the transfer device.

In addition, according to the present embodiment, three plates (the base plate 34, the first plate 38 and the second plate 40) are disposed to overlap one another longitudinally in the body part of the transfer device. Thus, the transfer device can be formed to be compact in the thickness direction of the plates.

In addition, according to the present embodiment, the stop positions of the chuck claws 44 of the chuck unit 42 can be changed desirably both in the horizontal direction and in the vertical direction by only changing indicated values of the horizontally driving servo motor 49 and the vertically driving servo motor 58 to change the rotation amounts of their output shafts (without changing any power transmission mechanism component such as a link). As a result, according to the present embodiment, the conveyance position can be adjusted even when the forging press machine 10 is being operated. Thus, the time required for the position adjustment work can be considerably shortened as compared with that in the background art.

Further, according to the present embodiment, the vertically driving servo motor 58 is attached to the base plate 34 in an opposite position to the first plate 38 with respect to the base plate 34 so that the output shaft 61 of the vertically driving servo motor 58 extends in the vertical direction. As a result, the vertically driving servo motor 58 and the plate to be driven thereby (the second plate 40) can be disposed closely to each other while holding the base plate 34 longitudinally therebetween. Thus, the second link mechanism 60 as a power transmission mechanism disposed between the vertically driving servo motor 58 and the second plate 40 can be formed with a shorter and more compact configuration.

In addition, according to the present embodiment, the plurality of chuck units 42 can be moved in a lump to a place where replacement work can be performed easily.

Further, according to the present embodiment, due to the configuration in which the horizontally driving servo motor 49 as a power source is connected through the first link mechanism 50 to the first plate 38 to be driven thereby, it is possible to dispense with a complicated cam mechanism. Thus, the power transmission mechanism can be made compact with a reduced number of components as compared with the background-art configuration. As a result, according to the present embodiment, components that may serve as obstacles when the chuck units 42 are rotated and moved can be made as few as possible. Thus, a wide movable range can be secured for the chuck unit 42.

Particularly according to the present embodiment, movement in the vertical direction can be carried out as well as movement in the horizontal direction. However, due to the configuration in which the vertically driving servo motor 58 is attached integrally with the base plate 34, the vertically driving servo motor 58 and the second plate 40 to be driven thereby can be disposed closely to each other. Thus, the second link mechanism 60 as a power transmission mechanism disposed between the vertically driving servo motor 58 and the second plate 40 can be formed with a shorter and more compact configuration.

Furthermore, the vertically driving servo motor 58 and the second link mechanism 60 rotate and move together with the base plate 34. Therefore, components of the power transmission mechanism can be effectively prevented from being left behind on the frame 12 side of the press machine 10 as obstacles when the vertically driving servo motor 58 and the second link mechanism 60 are rotating and moving.

Further, both the vertically driving servo motor 58 as a power source and the second link mechanism 60 are included on the side to be rotated and moved. It is therefore possible to dispense with isolation work for the second link mechanism 60.

The embodiment of the present invention has been described above in detail. However, the embodiment is merely an example. The aforementioned embodiment provides a configuration in which the first plate 38 is made slidable in the horizontal direction while the second plate 40 is made slidable in the vertical direction. According to another configuration, on the contrary, the first plate 38 may be made slidable in the vertical direction while the second plate 40 is made slidable in the horizontal direction. The present invention can be carried out in forms in which various changes are made without departing from the gist of the invention.

The present application is based on a Japanese patent application (Japanese Patent Application No. 2016-105669) filed on May 26, 2016, and a Japanese patent application (Japanese Patent Application No. 2016-105670) filed on May 26, 2016, the contents of which are incorporated herein by reference.

DESCRIPTION OF REFERENCE NUMERALS AND SIGNS 10 multistage forging press machine
30 transfer device
34 base plate
38 first plate
40 second plate
42 chuck unit
44 chuck claw
46, 55 guide rail
49 horizontally driving servo motor
50 first link mechanism
58 vertically driving servo motor
60 second link mechanism
81 rotational moving unit
W workpiece

What is claimed is:

1. A transfer device of a multistage forging press machine, the transfer device being provided in the multistage forging press machine in which a plurality of forging portions are provided side by side in a horizontal direction so that a workpiece is conveyed sequentially from one of the forging portions to a next one, the transfer device comprising:
   a base plate that includes a support surface extending in the horizontal direction and a vertical direction;
   a first plate comprising a surface that is slidable and movable along a guide rail provided on the support surface of the base plate;
   a second plate that is slidable and movable along an other guide rail provided on an other surface of the first plate that faces an opposite direction from a direction that the surface of the first plate faces the support surface, one of the first plate and the second plate being movable in the horizontal direction and an other one of the first plate and the second plate being movable in the vertical direction;
   a plurality of chuck units that are attached to the second plate to hold the workpiece;
   a horizontally driving servo motor that drives the one of the first plate and the second plate in the horizontal direction;
   a vertically driving servo motor that drives the other one of the first plate and the second plate in the vertical direction,
      wherein the horizontally driving servo motor is connected through a link mechanism to the one of the first plate and the second plate that is slidable and movable in the horizontal direction, and the vertically driving servo motor is connected through another link mechanism to the other one of the first plate and the second plate that is slidable and movable in the vertical direction, and
      wherein the vertically driving servo motor is attached to the base plate in an opposite position to the first plate with respect to the base plate so that an output shaft of the vertically driving servo motor extends in the vertical direction; and
   a rocking member including a holding arm and an extended lever extending in an opposite direction from the holding arm,
      wherein the holding arm is connected to the other one of the first plate and the second plate, and the extended lever is connected to a nut attached to the output shaft of the vertically driving servo motor, such that by a movement of the nut in a first direction, the rocking member swings to move the other one of the first plate and the second plate in a second direction that is opposite to the first direction.

2. The transfer device of the multistage forging press machine according to claim 1, further comprising:
   a rotational moving unit that rotates the base plate around an axis line in the horizontal direction so that the plurality of chuck units are rotated and moved together with the base plate.

3. The transfer device of the multistage forging press machine according to claim 2, wherein the rotational moving unit has a rotatable range of up to approximately 180° so that the chuck units are reversed in an opposite position to the forging portions with respect to the axis line.

4. The transfer device of the multistage forging press machine according to claim 1, wherein the other surface of the first plate extends parallel to the surface of the first plate.

5. The transfer device of the multistage forging press machine according to claim 1, wherein the other surface of the first plate and the surface of the first plate extend in the vertical direction.

6. The transfer device of the multistage forging press machine according to claim 1, wherein the other surface of the first plate and the surface of the first plate extend parallel to the support surface.

7. The transfer device of the multistage forging press machine according to claim 1, wherein the other surface of the first plate and the surface of the first plate extend parallel to the support surface in the vertical direction.

8. The transfer device of the multistage forging press machine according to claim 1, wherein a surface of the second plate, which faces the other surface of the first plate, is slidable and movable along the other guide rail.

9. The transfer device of the multistage forging press machine according to claim 8, wherein the chuck units are disposed on an other surface of the second plate which faces an opposite direction from a direction that the surface of the second plate faces the other surface of the first plate.

10. The transfer device of the multistage forging press machine according to claim 9, wherein the other surface of the second plate extends parallel to the other surface of the first plate.

11. The transfer device of the multistage forging press machine according to claim 9, wherein the surface of the second plate, the other surface of the second plate, and the other surface of the first plate extend in the vertical direction.

12. The transfer device of the multistage forging press machine according to claim 9, wherein the surface of the second plate, the other surface of the second plate, and the other surface of the first plate extend parallel to the support surface.

13. A multistage forging press machine, comprising:
   a plurality of forging portions provided side by side in a horizontal direction so that a workpiece is conveyed sequentially from one of the forging portions to a next one; and a transfer device, comprising:
- a base plate that includes a support surface extending in the horizontal direction and a vertical direction;
- a first plate comprising a surface that is slidable and movable along a guide rail provided on the support surface of the base plate;
- a second plate that is slidable and movable along an other guide rail provided on an other surface of the first plate that faces an opposite direction from a direction that the surface of the first plate faces the support surface, one of the first plate and the second plate being movable in the horizontal direction and an other one of the first plate and the second plate being movable in the vertical direction;
- a plurality of chuck units that are attached to the second plate to hold the workpiece;
- a horizontally driving servo motor that drives the one of the first plate and the second plate in the horizontal direction;
- a vertically driving servo motor that drives the other one of the first plate and the second plate in the vertical direction,
  - wherein the horizontally driving servo motor is connected through a link mechanism to the one of the first plate and the second plate that is slidable and movable in the horizontal direction, and the vertically driving servo motor is connected through another link mechanism to the other one of the first plate and the second plate that is slidable and movable in the vertical direction; and
- a rocking member including a holding arm and an extended lever extending in an opposite direction from the holding arm, wherein the holding arm is connected to the other one of the first plate and the second plate, and the extended lever is connected to a nut attached to an output shaft of the vertically driving servo motor, such that by a movement of the nut in a first direction, the rocking member swings to move the other one of the first plate and the second plate in a second direction that is opposite to the first direction.

14. The multistage forging press machine according to claim 13, wherein the vertically driving servo motor is attached to the base plate in an opposite position to the first plate with respect to the base plate so that an output shaft of the vertically driving servo motor extends in the vertical direction.

15. The multistage forging press machine according to claim 13, wherein the other surface of the first plate and the surface of the first plate extend in the vertical direction.

16. The multistage forging press machine according to claim 13, wherein the other surface of the first plate and the surface of the first plate extend parallel to the support surface.

17. The multistage forging press machine according to claim 13, wherein the other surface of the first plate and the surface of the first plate extend parallel to the support surface in the vertical direction.

18. The multistage forging press machine according to claim 13, wherein a surface of the second plate, which faces the other surface of the first plate, is slidable and movable along the other guide rail.

19. The multistage forging press machine according to claim 18, wherein the chuck units are disposed on an other surface of the second plate which faces an opposite direction from a direction that the surface of the second plate faces the other surface of the first plate.

20. The multistage forging press machine according to claim 19, wherein the other surface of the second plate extends parallel to the other surface of the first plate.

* * * * *